(12) United States Patent
Jha et al.

(10) Patent No.: US 12,461,724 B2
(45) Date of Patent: Nov. 4, 2025

(54) CODE ENERGY EFFICIENCY

(71) Applicant: SAP SE, Walldorf (DE)

(72) Inventors: Praveen Jha, Patna (IN); Prakash Kumar, Bangalore (IN); Prabhat Kumar Singh, Ranchi (IN); Sushanth B R, Bengaluru (IN); Maruthi Srinivas Singamsetty, Vijayawada (IN); Muhammed Bilal A, Kerala (IN)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 18/137,335

(22) Filed: Apr. 20, 2023

(65) Prior Publication Data
US 2024/0354082 A1  Oct. 24, 2024

(51) Int. Cl.
*G06F 8/41* (2018.01)

(52) U.S. Cl.
CPC .................. *G06F 8/4432* (2013.01)

(58) Field of Classification Search
CPC .................... G06F 8/40–52; G06F 8/4432
See application file for complete search history.

(56) References Cited

U.S. PATENT DOCUMENTS

| | | | |
|---|---|---|---|
| 10,168,990 B1 * | 1/2019 | Annamalai | G06F 1/03 |
| 2005/0114850 A1 * | 5/2005 | Chheda | G06F 9/30083 |
| | | | 717/151 |
| 2007/0198864 A1 * | 8/2007 | Takase | G06F 11/3062 |
| | | | 713/300 |
| 2009/0319988 A1 * | 12/2009 | Teranishi | G06F 8/4432 |
| | | | 717/110 |
| 2010/0205591 A1 * | 8/2010 | Barsness | G06F 8/4432 |
| | | | 717/151 |
| 2015/0052372 A1 * | 2/2015 | Barde | G06F 1/329 |
| | | | 713/320 |

(Continued)

OTHER PUBLICATIONS

Cruz, Luis, et al., Leafactor: Improving Energy Efficiency of Android Apps via Automatic Refactoring, MOBILESoft '17: Proceedings of the 4th International Conference on Mobile Software Engineering and Systems, May 2017, 2 pages, [retrieved on Jun. 26, 2025], Retrieved from the Internet: <URL:http://dl.acm.org/>.*

*Primary Examiner* — Geoffrey R St Leger
(74) *Attorney, Agent, or Firm* — Klarquist Sparkman, LLP

(57) ABSTRACT

Techniques and solutions are provided for increasing the energy efficiency of computing code. Many computing operations can be implemented in a number of different ways. While the end result of each implementation may be the same, the energy efficiency of the implementations can vary dramatically. Disclosed techniques provide rules that can be used to analyze code for a particular implementation of an operation. If a rule is triggered, a recommendation to replace the implementation with a more energy efficient implementation can be provided, or the code can automatically be changed to include the more energy efficient implementation. Techniques for defining rules are also provided, such as by measuring or estimating energy used by various ways of implementing an operation. Measurement or estimation of energy used during code execution can be performed in a containerized environment, such as to provide improved accuracy, and allow for parallelization.

20 Claims, 11 Drawing Sheets

(56) References Cited

U.S. PATENT DOCUMENTS

2015/0106797 A1\* 4/2015 Balasubramanian ........................
G06F 9/44536
717/153
2016/0196121 A1\* 7/2016 Baskaran .............. G06F 8/4432
717/157
2017/0256018 A1\* 9/2017 Gandhi ..................... G06T 1/60

\* cited by examiner

CODE ENERGY EFFICIENCY

FIELD

The present disclosure generally relates to improving the energy efficiency of code.

BACKGROUND

Software is a critical part of the functioning of nearly every human enterprise. Software runs on simple embedded devices as well as in more complex computing environments, such as in mobile devices, personal computing devices, enterprise computing systems, and cloud computing systems. Software execution requires the use of a computer processor, as well as computing resources such as memory and, in many cases, network connectivity. Many of these uses, such as computer processor use or network connectivity (for example, the use of a radio in a portable device) are correlated to energy use. The complexity of software/the degree of use of particular software is often directly associated with a degree of energy use—if a processor is used more, more energy is used.

Reducing computing resource use is often desirable for its own sake, as contention exists in many computing systems for their computing resources. However, even if sufficient computing resources are available, it can be desirable to reduce the energy required for software execution, such as based on climate change considerations. As with many fields that use energy generated from processes that produce carbon dioxide (or other greenhouse gases) as a byproduct (for example, the burning of fossil fuels for electricity), it can be beneficial to reduce energy usage in order to reduce the carbon footprint of an activity, whether required by law or regulation, or by software users simply attempting to be good global citizens. Accordingly, reducing software energy consumption is an ongoing concern, and room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for increasing the energy efficiency of computing code. Many computing operations can be implemented in a number of different ways. While the end result of each implementation may be the same, the energy efficiency of the implementations can vary dramatically. Disclosed techniques provide rules that can be used to analyze code for a particular implementation of an operation. If a rule is triggered, a recommendation to replace the implementation with a more energy efficiency implementation can be provided, or the code can automatically be changed to include the more energy efficient implementation. Techniques for defining rules are also provided, such as by measuring or estimating energy used by various ways of implementing an operation. Measurement or estimation of energy used during code execution can be performed in a containerized environment, such as to provide improved accuracy, and allow for parallelization.

In one aspect, the present disclosure provides a process for evaluating code for potential energy efficiency improvements, and automatically making, or recommending, changes to improve energy efficiency. A set of instructions expressed in a programming language is received. A request is received to analyze the set of instructions to determine whether one or more instructions of the set of instructions are replaceable with a more energy efficient instruction for performing a function accomplished by a respective instruction of the one or more instructions.

For instructions of the one or more instructions, a respective rule defined for a respective instruction of the one or more instructions is determined. For instructions of the one or more instructions, it is determined whether the respective rule is triggered to determine a set of the one or more instructions having a triggered rule.

For respective instructions of the set of the one or more instructions for which a respective rule was triggered, a respective instruction of the set of one or more instructions is replaced with a replacement operation specified in the respective rule. Or, a notification is provided that the replacement operation specified in the respective rule may improve energy efficiency of the set of instructions.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
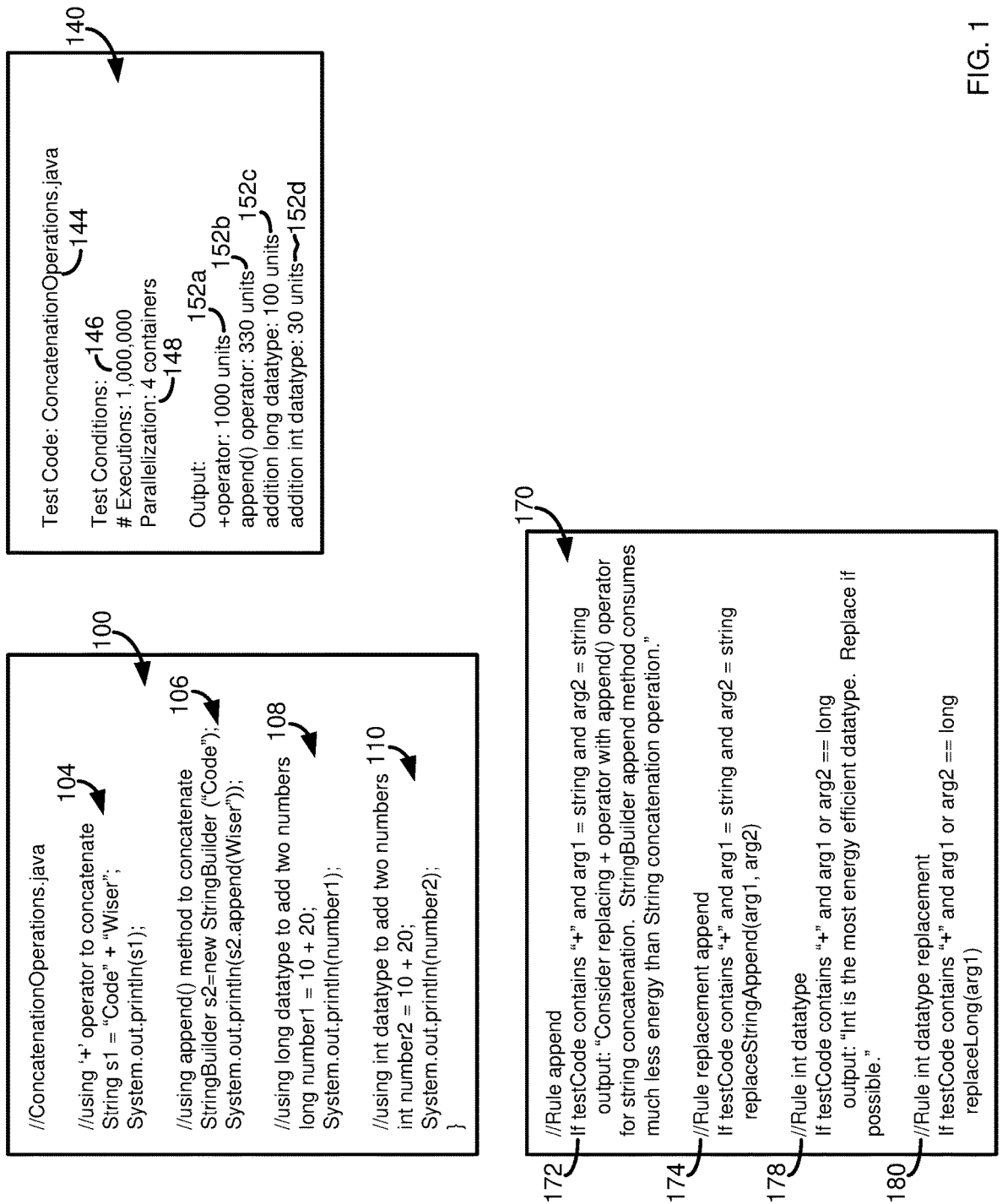
FIG. 1 illustrates example code to be analyzed for energy efficiency, a test scenario illustrating test conditions and test results of analyzing operations of the example code, and rules for improving code efficiency that can be defined and applied for operations in the example code, including based on the test results for the example code.

Software is a critical part of the functioning of nearly every human enterprise. Software runs on simple embedded devices as well as in more complex computing environments, such as in mobile devices, personal computing devices, enterprise computing systems, and cloud computing systems. Software execution requires the use of a computer processor, as well as computing resources such as memory and, in many cases, network connectivity. Many of these uses, such as computer processor use or network connectivity (for example, the use of a radio in a portable device) are correlated to energy use. The complexity of software/the degree of use of particular software is often directly associated with a degree of energy use—if a processor is used more, more energy is used.

Reducing computing resource use is often desirable for its own sake, as contention exists in many computing systems for their computing resources. However, even if sufficient computing resources are available, it can be desirable to reduce the energy required for software execution, such as based on climate change considerations. As with many fields that use energy generated from processes that produce carbon dioxide (or other greenhouse gases) as a byproduct (for example, the burning of fossil fuels for electricity), it can be beneficial to reduce energy usage in order to reduce the carbon footprint of an activity, whether required by law or regulation, or by software users simply attempting to be good global citizens. Accordingly, reducing software energy consumption is an ongoing concern, and room for improvement exists.

In many cases a variety of options exist for performing software implemented tasks. For instance, software typically can be implemented in one of many possible programming languages, where a program language can affect how efficiently code executes. Typically, languages like C++ are more computationally efficient than languages such as JAVA. However, computational efficiency concerns may be overridden by factors such as ease of programming or having code be executable on multiple computing environments. For example, JAVA code can typically be executed on a variety of platforms, while C++ may have to be compiled for separate environments, and the code itself may need to change to accommodate particular environments.

Even within a particular programming language, however, the same task can often be implemented in a variety of ways. For example, a particular variable may hold only integer values, but could be declared as an integer, a float, a double, or other numerical datatype. Often different datatypes will be processed differently by a computer, such as where instances of an int datatype may be assigned less memory than floats or doubles. In the case where a program will only use integer values, the variable could be declared as a float, even though the float takes up extra memory that is essentially "wasted." Processing operations can be more computationally expensive with the float data type, including because calculations may be performed on bits that have no practical effect on an outcome.

The programming process is replete with these kinds of decisions. A process implemented as a loop, for example, can be implemented in various ways, including as a "for" loop or as a "while" loop. While both loops may produce the same outcome, the use of one loop may result in higher energy usage (including due to higher processor use) than another. Similarly, consider a switch statement. A switch statement can be written in various ways, such as where difference cases for the switch statement are provided in different orders. It may be that some cases are more likely to occur than others. Thus, having more commonly occurring conditions appear at the beginning of a switch statement can reduce computational effort, and energy use, since fewer evaluations need to be performed before the appropriate condition is identified. If the most common condition were included last (for example, prior to a default action), in most cases one or more unnecessary evaluations would be carried out. Good coding practices may help ensure that efficient code is written. As a practical matter, code that is actually written can stray far from this ideal.

The present disclosure provides techniques and solutions that can assist in the development of energy efficient code, which typically also is code that executes more efficiently, and thus reduces the use of computing resources, and in turn is more energy efficient. In one aspect rules are defined that can be used to analyze code for possible code inefficiencies, and to either suggest code revisions or automatically revise code using more efficient coding constructs. Rules can be manually defined, such as by users who have an understanding of how particular code statements are processed, and substitutability of code statements.

In some cases, it may not be clear whether one code expression is more efficient than another code expression that provides a comparable result. In such cases, substitutable code expressions can be executed, and the energy use measured. Lower energy-use code expressions can then be designated as suggestions to be provided if code is found to have a less efficient expression, or in some cases less efficient options can be automatically replaced with more efficient options.

Sometimes code elements interplay together such that the application of comparatively simple replacement rules may not provide code that is more energy efficient than other alternatives. Similarly, code that ends up being most efficient for a particular use case can depend on factors other than/in addition to the code itself. For example, code that is most efficient for a particular use can depend on specific data, or specific types of data, that is processed. Or, code efficiency may be influenced by an environment on which the code is executed, which can include the nature of the computing resources (processor, memory) available or other operations that are performed in the computer environment concurrently with code being analyzed for energy efficiency.

In such cases, particular code that has been adjusted, or suggested for adjustment, for energy efficiency purposes can be executed (such as a particular software application that includes the relevant code, or particular functionality of such an application) and energy use measured. Energy used can be compared before/after a code change, or multiple code changes, to determine how a larger section of code performs with its constituent changes. Additional changes can be made/recommended as appropriate, and in at least some cases can be added to a library of code changes/suggestions, either automatically or in response to user input. In a similar manner, code execution can be performed using one or more particular test data sets to determine which version of code performs more efficiently with respect to one or more specified data sets (and where the results can also be used as the basis for new rules/rule adjustment).

Code changes can be performed in a variety of ways. As discussed, changes can be suggested to a user, or can be made automatically. When code changes are made automatically, they can be made to source code, prior to compilation or interpretation. Alternatively, code changes can be made in a manner that is opaque to a user. That is, for example, a compiler can be programmed to automatically replace at least certain less energy efficient code with more energy efficient code implementing a common function. The difference might be reflected in the compiled code, but not made to the source code, and the user may or may not be notified that such changes were made.

Example 2—Example Generation and Application of Rule Improving Code Energy Efficiency FIG. 1 illustrates example code 100 that represents various specific code segments that can be used to perform a particular function/provide a particular outcome, and which can also be subjected to testing to determine their respective energy use. A test scenario 140 is also provided in FIG. 1 (including test conditions and test results), as well example rules 170 that can be used to advise a user as to potential ways of increasing the energy efficiency of their code/a program using such code or to automatically apply such changes to improve code energy efficiency.

Turning first to the example code 100, code segments 104 and 106 provide two different ways of performing string concatenation, particularly in the JAVA programming language, while code segments 108 and 110 provide two techniques for adding numbers, differing in the datatype used.

Taking first the string concatenation operations, code segment 104 performs string concatenation using the addition operator, which calls particular functionality of a programming language that performs a particular type of "addition," where the implementation can depend on the operands used. That is, the addition operator may perform arithmetic addition for numerical datatypes, whereas string concatenation may be used for datatypes such as strings or character arrays.

When the string addition operator is used as such (that is, not converted by a compiler to another string concatenation technique/method), memory is allocated for both of the operand strings. JAVA implementations can consider strings as immutable objects, and so a first string may be converted into an intermediate object type. The second string can then be appended to the first string in the intermediate object type. The combination of the first and second strings in the intermediate data type can then be converted back to a string datatype. Thus, the code segment 104 can require operations in creating the intermediate object and removing the intermediate object (garbage collection), including operations to allocate and deallocate memory.

On the other hand, the JAVA StringBuilder class uses string-like objects, but the objects are modifiable instead of being immutable. The StringBuilder objects can be comparable to variable-length arrays, where the size of the array and the contents of the array can be changed by suitable methods. Thus, use of StringBuilder instead of the addition operator for strings avoids the creation/deletion of the intermediate object, as well as the conversion operations to and from the intermediate object type.

While this may seem like a simple, trivial example that may not have a significant impact on energy use, the operational differences can result in vastly increased processing time if many strings are to be concatenated. For example, one study found that in concatenating the same string with itself for 200,000 iterations took 373,993 milliseconds (6.2 minutes) when the string addition operation was used, but only 5 milliseconds when the StringBuilder.append( ) method was used. It also was observed that the string addition operator had 100% CPU usage during its execution.

While the method used in the study might be considered somewhat artificial, in fact many applications involve a large number of iterations of the same operation or sequence of operations. For example, database applications can require reading or writing of millions of records for enterprise use, including in evaluating selection clauses, such as the evaluation of JOIN conditions (consider a hash join, for example).

The code segments 108, 110 are identical, other than the datatype used for addition. In this case, JAVA uses 4 bytes to represent int datatypes, but uses 8 bytes to represent the long datatype. Thus, using a long datatype versus an int datatype results in twice as much memory usage, and also increases the number of calculations performed by a processor, even though such calculations may be "wasted" if, for example, a value that could have been represented as an int is instead represented and processed as a long datatype. Again, while a difference of 4 bytes may not matter much on its own, repeated numerical addition operations can quickly give rise to significant differences in memory/processor use.

As will be further explained, some types of code substitutions can be more "invisible" to a user than others. In the case of string concatenation, it may be that any string provided as input could be used with either the addition operation or the StringBuilder append operation. In this situation, it may be more appropriate to automatically make code changes, at least in some implementations.

On the other hand, some changes can result in errors or unexpected operation, including based on particular input received. That is, int and long datatypes may be interchangeable so long as an input number is representable as an integer—such as having less than a threshold number of elements/digits. Larger numbers may need to be represented using another datatype, such as long. However, it may be difficult for a program to "know" what type of input to expect. Accordingly, automatically changing code from using a long datatype to an int datatype may result in program crashes/unexpected behavior. In these situations, it may be more appropriate to alert a user to consider changing from long to int, since the user presumably has a better understanding of the data that will be processed by the program. However, users may appreciate this notification, as they may have selected a long datatype without considering memory/energy use issues, and whether an int datatype might suffice for their needs.

In further implementations, actual or example data sets can be provided. Such datasets can be analyzed to determine if all input in the data set is representable using an int datatype. If so, depending on a particular desired use scenario, the datatype change may be made automatically if the analysis of the data set indicates that int is sufficient.

In some cases, a user may already know, or suspect, what particular code implementation may be most energy efficient for conducting a particular operation, and so can define suitable rules. However, in other cases, it may not be apparent to a user how various ways of accomplishing an operation compare in terms of energy efficiency. Accordingly, all or a portion of particular code can be specified for execution, and the energy use can be measured or estimated. For example, actual energy use can be measured, or the use of a processor or other computer resources can be measured/monitored, and those values converted to energy values.

The example test scenario 140 reflects both input/configuration parameters for a test and output results. The test scenario 140 can represent the results of executing a test function. That is, a function can be programmed to receive input such as a file to be tested (or other identifier for code to be executed during the test), a number of executions of code to be performed, or a degree of parallelization. When the test function tests code with respect to data external to the code, an identifier of one or more data input sources can be provided.

The inputs to the test function can be summarized in the test scenario 140, where an identifier 144 of a test file, an identifier 146 of a number of executions that were performed during the testing, and an identifier 148 of a degree of parallelization used in the testing are provided. In this specific example, the identifier 148 indicates that four containers were used to carry out the number of executions specified by the identifier 146. Typically, the number of executions are evenly distributed between the number of parallelization units. However, other partitioning schemes can be used, such as if one parallelization unit has a greater amount of resources than another parallelization unit. Examples of parallelization units/containers will be further described, but in general can refer to an independent operating environment that can be monitored for energy/computing resource use.

The test scenario 140 also shows the output of the particular test instance. Respective amounts 152a-152d amounts of computer processor or energy use are provided for each of the code segments 104, 106, 108, 110 of the example code 100. The test scenario 140 shows the amounts 152a-152d using a generic "unit," where in practice this would typically be replaced by a specific unit, such as an amount of energy (kilowatts, kilowatt/hours) or an amount of processor use (such as a number of cycles), where again typically units that do not directly reflect energy use can be converted to measure (at least estimates) of energy use. Although a single type of output 152a-152d is shown, in practice multiple measures of energy or computer resource use can be provided, such as displaying an amount of energy used, an amount of memory used, a number of computing operations performed, or a number of processor cycles used.

In some cases, code to be tested for energy/computer resource use can include code segments that are desired to be tested along with code segments that are not desired to be tested. Code segments can be selected for testing in particular ways, such as by setting a variable in the code that indicates whether a particular code segment should be tested, which can also be implemented by providing start/stop notations (either using variables or comments) in the code. If the code segments desired to be tested may change for a given test, code segments can be associated with different variables that are correlated with input provided when a test is executed. For example, assume code segments 1, 2, and 3 are associated with respective Boolean variables indicating whether a given code segment should be tested during a particular test request. If all three code segments were to be tested, the input could be (A=true; B=true; C=true). If only code segment 2 was to be tested, the input could be (A=false; B=true; C=false), where similar types of input can be used to implement other test combinations of one or more of the code segments.

As to the specific details included in the test scenario 140, which reflects results of the example code 100, it can be seen that the string concatenation operator 104 uses about three times as many units of energy/computer resources as the StringBuilder append method 106. The long datatype addition method 108 uses about three times as many units of energy/computing resources as the integer method 110. Thus, based on these results, it can be determined, either manually by a user or automatically, that methods 106, 110 are more efficient than methods 104, 108, and rules defined to either suggest replacing the less efficient code with the more efficient code, or automatically changing the less efficient code to the more efficient code.

The examples rules 170 reflect how various suggestions can be provided, or code automatically modified, if it is determined that particular code includes an implementation of a particular operation/functionality that may be less energy efficient than other options.

A rule 172 analyzes code for the use of the additional operator with strings. The rule 172 looks for the addition operator in the code. If the addition operator is identified, the operands used with the addition operator are analyzed to determine whether both operands are strings. If both operands are strings, a message is displayed indicating to a user they may wish to consider using the StringBuilder append method in place of string concatenation. A rule 174 operates in a similar manner as the rule 172, but calls a replaceStringAppend function using the two operands as function arguments if the rule conditions are satisfied. The replaceStringAppend function causes the analyzed code to be edited to replace the string concatenation code with the StringBuilder append method.

Rules 178 and 180 are similar to the rules 172, 174. The rule 178 analyzes code for the addition operator (a reserved word in JAVA). If the addition operator is identified and either operand has the long datatype (such as by checking to see if the variable was declared as a long datatype, where "long" is also a reserved word), a suggestion to change the long operand to an int datatype is provided in the rule 178, whereas a function to replace a long datatype with an int datatype is called in the rule 180.

Figure 2:
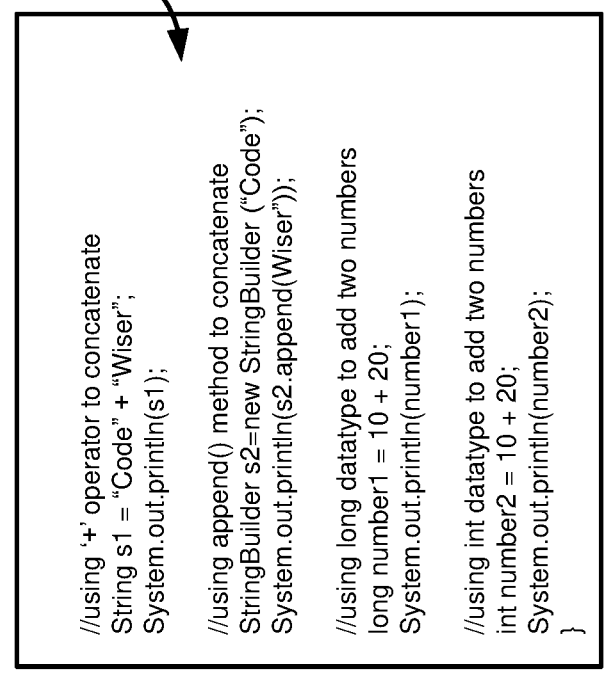
FIG. 2 illustrates example output for an analysis of the example code of FIG. 1 using the example rules of FIG. 1.

FIG. 2 provides example results 250 of executing the example rules 170 on the example code 100 of FIG. 1 In this case, an analysis operation is configured to provide suggestions for improving code energy efficiency, rather than automatically replacing less energy efficient code with more energy efficient code. Thus, rules 172 and 178 are applied to the example code 100, where the analysis finds that both rules are triggered since the example code uses both the string concatenation operator and the long datatype.

The results 250 are presented, in this particular example, in the form of a table. A column 254 provides an identifier for a particular rule "violation" for a given code analysis, a column 256 provides an identifier of the line at which the violation was observed, and a column 258 includes the appropriate recommendation specified by the respective rules 172, 178.

Figure 3:
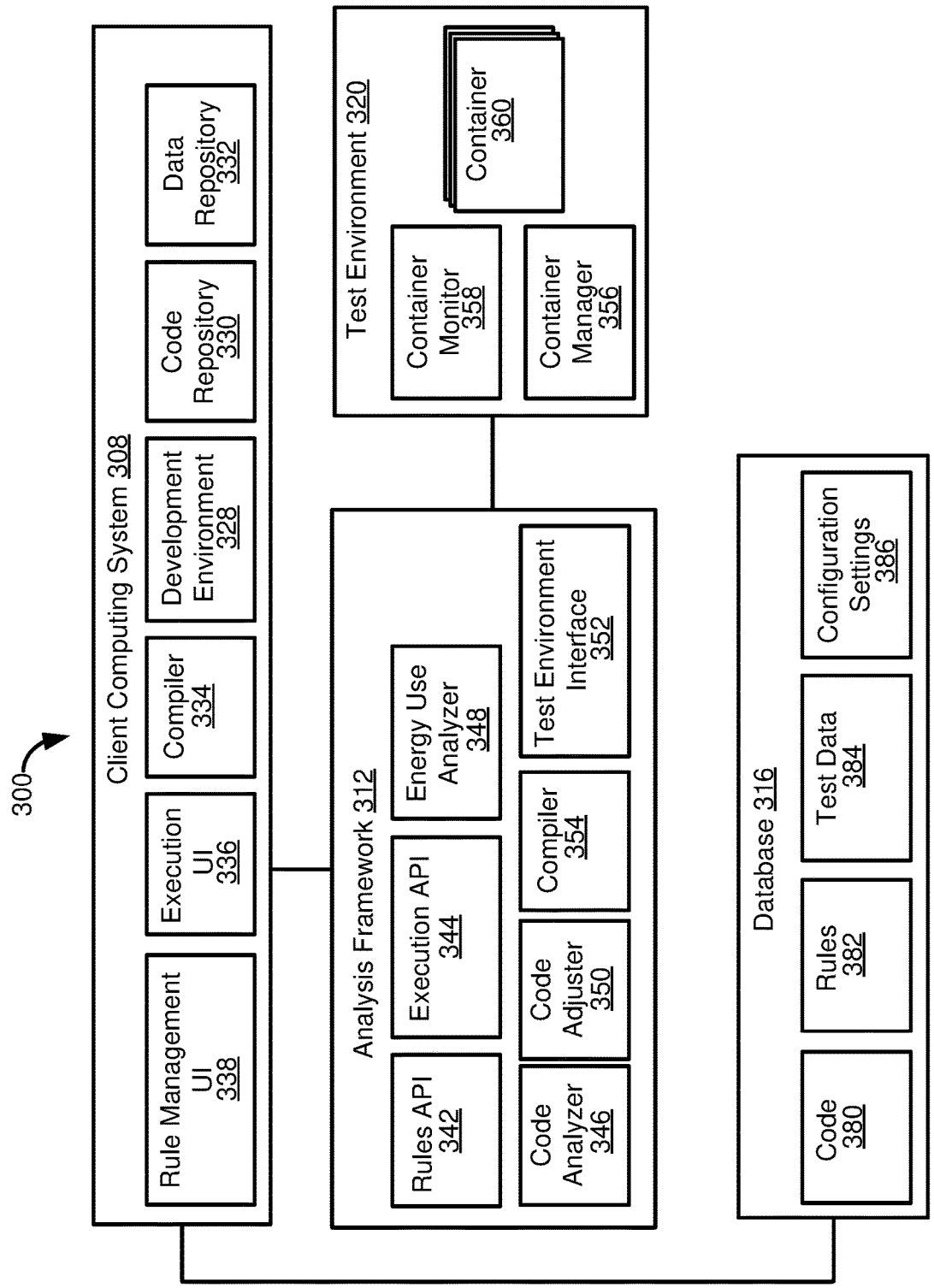
FIG. 3 is a block diagram of a computing environment in which disclosed technologies can be implemented.

Example 3—Example Computing Environment Facilitating Development of Energy Efficient Code FIG. 3 illustrates an example computing environment 300 in which disclosed techniques can be implemented. Generally, the computing environment 300 includes a client computing system 308 where a user or process generates or edits code. Analysis of the code for energy efficiency can be performed by an analysis framework 312. Various data associated with code analysis can be stored in a database 316. Code can be analyzed for energy use using a test environment 320. The operations of these components of the computing environment 300 will be further described. It is also noted that various functionalities of the components can be organized other than as shown, including with some components, or particular functionalities thereof, being combined with/being implemented by other components/functionalities. For example, if desired, the analysis framework 312 can be integrated into the client computing system 308.

The client computing system 308 includes a development environment 328, which can be an integrated development environment. The development environment 328 can allow a user to write and edit code. The development environment 328 can also perform functions related to code energy efficiency. For example, the development environment 328 can monitor code as it is being entered, and analyze the code for possible changes to improve energy efficiency. Or, the development environment 328 can analyze code for energy efficiency upon a user request, such as by a user selecting an appropriate user interface element of a graphical user interface provided by the development environment 328.

The development environment 328 can also provide an option (such as upon selection of an appropriate user interface element) to measure the energy used by a selection of code. When code is to be tested for energy efficiency, a user can perform actions such as selecting a compiled program to be executed, or selecting uncompiled code, which can be compiled and then executed. If program execution includes receiving external input, a user can manually provide such input, or can specify particular data to be used as input. Similarly, if particular code/a program requires the use of additional code (such as another application), the relevant parameters can be entered by a user, including through the development environment 328.

Code created using the development environment 328, or which is desired to be made accessible to the development environment, can be stored in a code repository 330. As discussed, some code may use or require input data (either in terms of user input through a user interface, or data otherwise processed by a program, such as a program that performs queries of particular database tables). Such data can be stored in a data repository 332 of the client computing system 308. However, as will be further discussed, all or a portion of the data may be optionally stored in another manner, including on another component of the computing environment 300, such as in the database 316.

At least some types of code useable in disclosed techniques may need to be compiled before execution, such as code written in C++. Accordingly, the client computing system 308 can include a compiler 334. Although shown as a single complier 334, in practice, a compiler can be included for each programming language to be used with the development environment 328. Similarly, in some cases it may be desirable to have multiple possible compliers 334 that can be selected for use with a given programming language. Typically, the compiler 334 can be accessed using appropriate commands from the development environment 328.

The client computing system 308 can include an execution user interface 336. The execution user interface 336 can be used to analyze code, including in a similar manner as described for the development environment 328. That is, disclosed techniques can be considered as implementable in an extension or plugin, such as for the development environment 328, or a separate application/interface can be provided for analyzing code. For example, particular code to be analyzed can be specified using the execution user interface 336, such as selecting code stored in the code repository 330.

The client computing system 308 is also shown as including a rule management user interface 338. The rule management user interface 338 can allow users to create, edit, and delete rules used to determine code energy efficiency, including as further discussed with respect to the analysis framework 312. The rule management user interface 338 can allow a user to perform other actions, such as specifying rule priorities, or rules that will be active for the execution user interface 336 or the development environment 328. Additional actions that can be performed using the rule management interface 338 include specifying rules that should be used with particular programming languages, or rules to be used for particular users or user groups. For example, it may be known that certain rules may not be suitable for use with some kinds of applications (that is, it is known that for various reasons less energy efficient code is preferable for a particular use scenario). Optionally, rule management functionality can be integrated into the execution user interface 336 or the development environment 328.

The analysis framework 312 can include a rules API 342 that receives calls from the rule management user interface 338 or the development environment 328, such as to (such as through suitable API methods) create/modify rules, specify rule configuration or ordering, analyze code, or measure energy used during code execution. An execution API 344 can receive calls from the execution user interface 336 or the development environment 328 to, for example, measure code energy use or to analyze code for potential energy efficiency improvements.

When a request to analyze code is received through the execution API 344, functionality of a code analyzer 346 can be called. The code analyzer 346 analyzes particular code using one or more rules or rule sets, and determines compliance with such rules. In some cases, the compliance results are provided as suggestions for modifying code, which can be provided in response to a call made to the execution API 344. In other cases, such as when rules specify that code should be automatically modified, code modifications can be performed by a code adjuster 350, where modified code is returned in response to a call made to the execution API 344. Or, code changes can be saved as updated code, such as saving modified code in the code repository 330. If the code changes are automatically made, the execution API 344 can provide a summary of code changes made in response to a call to the execution API. Code changes themselves can be provided in response to the call. For example, code changes can be made to code displayed on a user interface of the development environment 328, optionally being highlighted or otherwise annotated to indicate that relevant code was modified as a result of a code analysis.

As described above, the analysis framework 312 can also be used to analyze energy used during code execution, which can be for the purpose of evaluating/defining rules, or in response to a user request to evaluate the energy use of particular code. Energy analysis requests can be processed by an energy use analyzer 348. The energy use analyzer 348 can generate test scenarios, such as by gathering appropriate code or resources to be used along with code execution, such as input data. In the event code has not previously been complied, the energy use analyzer 348 can cause the code to be compiled by a compiler 354 (which can otherwise be similar to the compiler 334).

In some cases, the energy use analyzer 348 can directly execute, or cause the execution of, particular test code, such as on a computing system that hosts the analysis framework 312. In other cases, testing may be performed in a particular environment that facilitates monitoring energy used by code, or the use of computing resources, which in turn can be used to estimate energy usage. In particular, the computing environment 300 is shown as including the test environment 320. The energy use analyzer 348 can configure tasks to be executed using the test environment 320, where sending tasks to, and receiving results from, the test environment can be mediated by a test environment interface 352.

Figure 7:
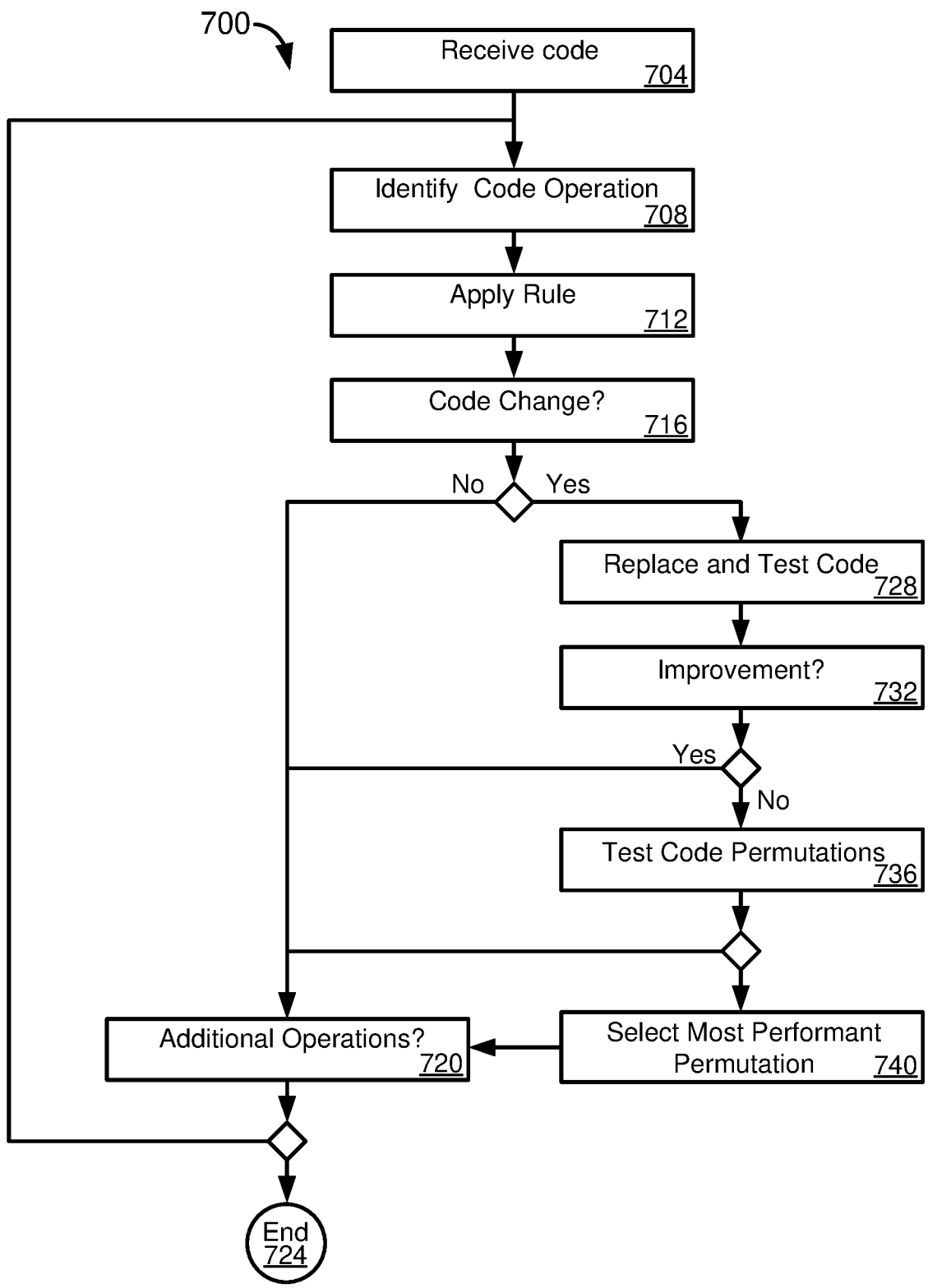
FIG. 7 is a flowchart of a process of analyzing code for energy efficiency by analyzing permutations of multiple code operations.

The energy use analyzer 348 or another component, such as the code analyzer 346 or the code adjuster 350, can perform tasks such as identifying portions of code that can be analyzed as discrete units, including for purposes of evaluating the energy efficiency of making (or not making) code changes indicated by a rule (such as the process 700 of FIG. 7). For example, the implementing component can parse tokens in programming language, such as brackets or parenthesis, to determine groupings of instructions. If function calls are identified, code implementing the function can be included in a test scenario. Similarly, for variables used in particular code, the declarations of, or assignment of values to, such variables can be included in a unit of code assembled for execution. Suitable techniques for implementing this functionality are available in development environments (including integrated development environments).

The test environment 320 can, in some implementations, be a cloud/hyperscalar computing system. The test environment 320 can be configured to execute tests (code executions) in one or more containers 360 in a containerized environment, where typically the containers are operated independently of one another. Executing code in a container 360 can be beneficial, such as because it can allow for parallelization of test executions, and because it can provide a "sandboxed" environment that allows energy used by test code to be more accurately measured (for example, separating test code from applications that might be running on a non-sandboxed system, or from other computing processes, such as an operating system).

The containers 360 can be managed by a container manager 356. The container manager 356 can be responsible for creating and configuring containers 360, as well as removing them as appropriate. The container manager 356 can also be responsible for scheduling execution of code tests to the containers 360, such as in response to a job request received from the test environment interface 352. The test environment 320 can also include a container monitor 358, where the container monitor monitors energy/computing resources used by the containers 360. Although any suitable implementing technology can be used for the container manager 356 and the container monitor 358, in a specific example KUBERNETES (the Linux Foundation) is used as the container manager and PROMETHEUS (the Linux Foundation) is used as the container monitor.

The database 316 can store a variety of information used with aspects of the disclosed innovations, either as a "primary" source of data or in addition to data stored by another component of the computing environment 300 (for example, code in the code repository 330). In particular, the database 316 can store code 380, which can be code that may be desired to be analyzed, or used with code being analyzed. The database 316 can also store rules 382 used to evaluate code for energy efficiency, such as rules entered through the rules API 342. Rules can be retrieved from the rules 382 during the execution of a code analysis request.

The database 316 can store test data 384, which can be data used as input to code being tested (either for measuring energy use, or in some cases for analyzing code using one or more rules in the rules 382. The database 316 can also store configuration settings 386, which can represent settings used by the test environment interface 352 or components of the test environment 320. The configuration settings 386 can also include definition of test scenarios or rule sets, such as defining a combination of test code and test data for a particular analysis, or storing rule sets that should be used with particular code or with particular users or user groups.

Figure 4:
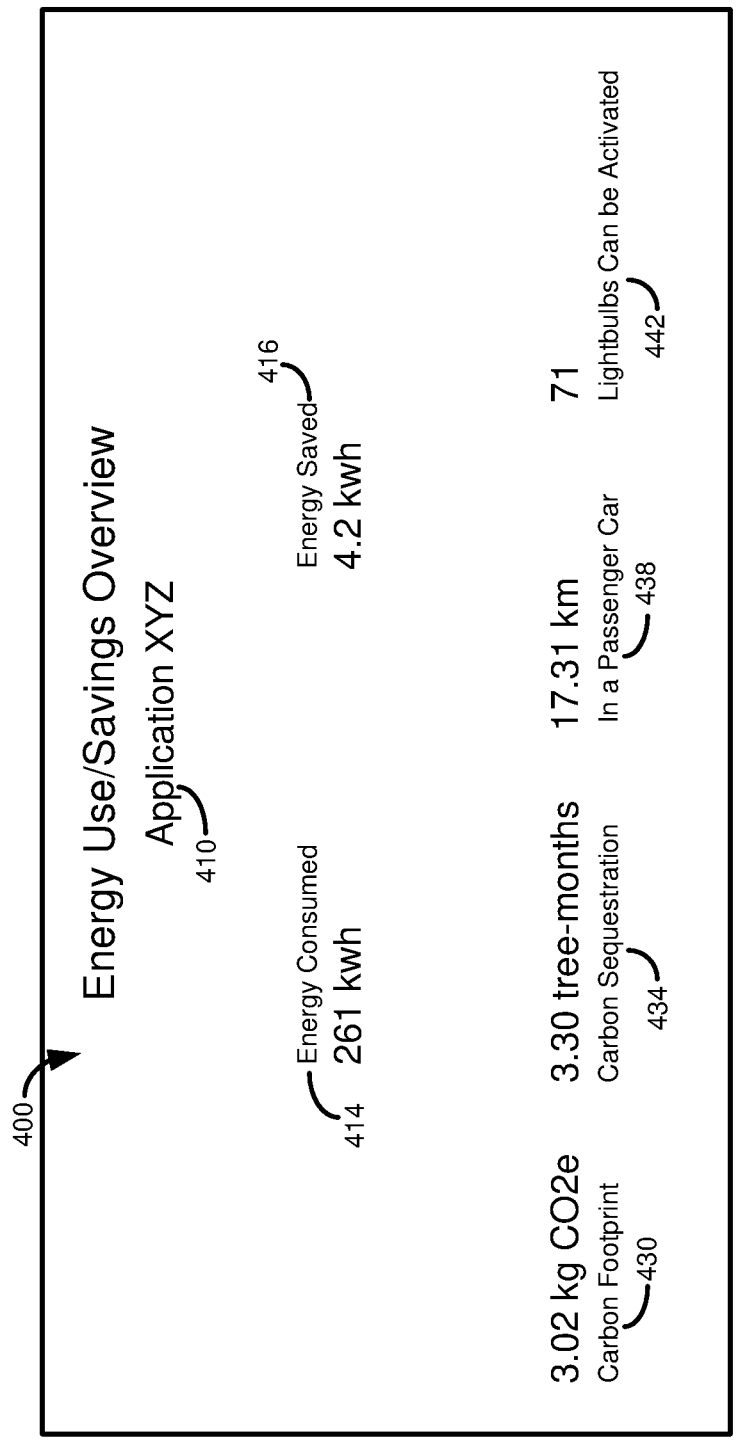
FIG. 4 is an example user interface screen for displaying results of analyzing code for energy efficiency, including energy saving generated by replacing less efficient code instructions with more efficient code instructions.

Example 4—Example User Interface Screens Displaying Code Energy Efficiency Information and Configuration Settings FIG. 4 is an example user interface screen 400 that can be displayed to show energy used by code, including energy saving obtained using disclosed techniques—either by manual implementation of suggested code changes or code changes that were automatically applied.

An application, or code, identifier 410 is provided that identifies particular code whose energy use information is displayed on the user interface screen 400. An amount of energy consumed 414 is displayed, as is an amount of energy savings 416 achieved through code changes suggested/made using disclosed techniques.

Note that the energy consumed value 414 may be directly measured, indirectly estimated using measured quantities of computer resources (e.g., processor, memory), or estimated using another technique. For example, individual code operation types can be associated with an energy use value, and the energy consumed value 414 can be generated by adding all of the energy use values for the individual code operation types in the code.

In a similar manner, the energy savings 416 can be directly measured, can be estimated from measurement of computer resource use, or estimated in another manner. In a particular example, energy used by an original code version can be obtained from direct energy measurements or estimated from measurements of computing resources used and energy used by a revised code version can similarly be obtained. The energy saving (if any) can then be provided by calculating the difference of these values. In another example, energy used by operations in the original code is calculated, and then energy used by the revised code is calculated by subtracting energy values for removed operations resulting from a code change and adding energy values for added operations as a result of the code change.

For various purposes, including to provide positive reinforcement to developers seeking to make their code more energy efficient, the energy savings 416 for particular code can be converted to other measures that may be more meaningful/impactful to developers. In particular, the user interface screen 400 illustrates energy savings being converted to a reduced carbon footprint value 430, a measure of carbon sequestration 434 represented by the energy savings that would have otherwise been needed, an amount of miles driven in vehicle 438 represented by the saved energy, or a number of light bulbs 442 that could be operated using the energy savings.

Figure 5:
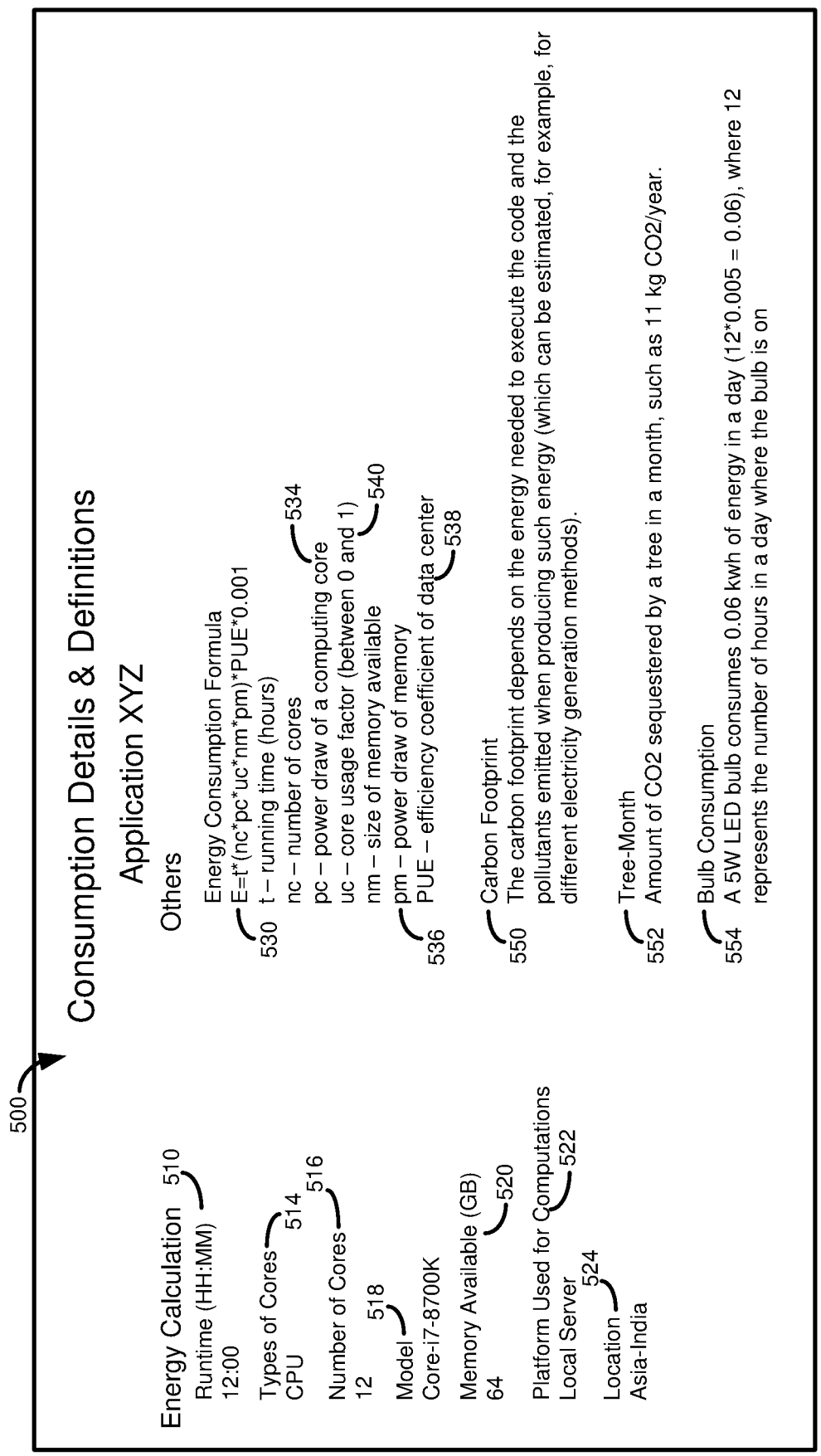
FIG. 5 is an example user interface screen for viewing/editing configuration and calculation settings for analyzing code energy use.

FIG. 5 illustrates a user interface screen 500 providing details about how various values of the user interface screen 400 can be calculated. At least some of these options can be modified by a user.

The user interface screen 500 illustrates various configuration details/operating environment details that can affect how energy use is calculated. For example, a runtime 510 is specified, which can be used to indicate how long particular code will be executed. In other examples, the runtime 510 can be specified as a number of program executions, or a number of executions of particular functionality of a particular program. Typically, it can be desired to obtain energy use measurements/estimates for multiple code executions, such as to provide more accurate results, including to account for variability in energy use between execution iterations.

A number of settings in the user interface screen 500 relate to properties of a computing environment on which the code is executed, and energy measured or estimated. In the example shown, the settings include a type of processor (or processor core) 514, a number of processors (or processor cores) 516, a processor model/type 518, and an amount of available memory 520. As described in conjunction with the discussion of FIG. 3, execution can be performed locally or remotely, and an execution platform 522 can be specified using the user interface screen. A location 524 can also be specified, which can be a location of the execution platform 522. Among other things, the location 524 can be used to determine a power generation technique used, which can affect the emissions/sequestration/comparative savings examples shown in FIG. 4. That is, for example, one value for the location 524 might be associated with a coal-fired power plant, while another location might be associated with electricity generated by renewable energy production methods, such as solar or wind.

FIG. 5 illustrates a formula 530 for calculating/estimating energy use based on amount of computing resources used, and the types of computing resources involved, such as using values of the settings 510-524. The formula 530 includes a measure 534 of the power draw of a computing core, which can be correlated with processor model setting 516. Similarly, a type of memory associated with the available memory setting 518 can be correlated with an amount of power used by the memory, and provided in a measure 536 used in the formula 530. The platform setting 522, and optionally the location setting 524, can be used to determine an efficiency coefficient 538 for the particular platform used in a given code evaluation. The formula 530 includes a core usage measure 540, which can be a result determined based on executing the code for the period of time/number of iterations specified in the runtime setting 510.

The user interface screen 500 also provides information about how carbon footprint 550, sequestration information 552, and bulb equivalent use 554 can be calculated for energy savings associated with code changes suggested/ made using disclosed techniques. The information 550, 552, 554 can optionally be customized by a user, or based on certain settings used. For example, a carbon footprint calculation used for the carbon footprint information 550 can use one or both of the execution platform setting 522 or the location setting 524 (again, where this information can be used to determine an electricity production technique, which affects the amount of carbon produced/saved, and which in turn can affect other calculations, such as the sequestration information 552).

Example 5—Example Analysis of Code for Energy Efficiency Improvement

Figure 6:
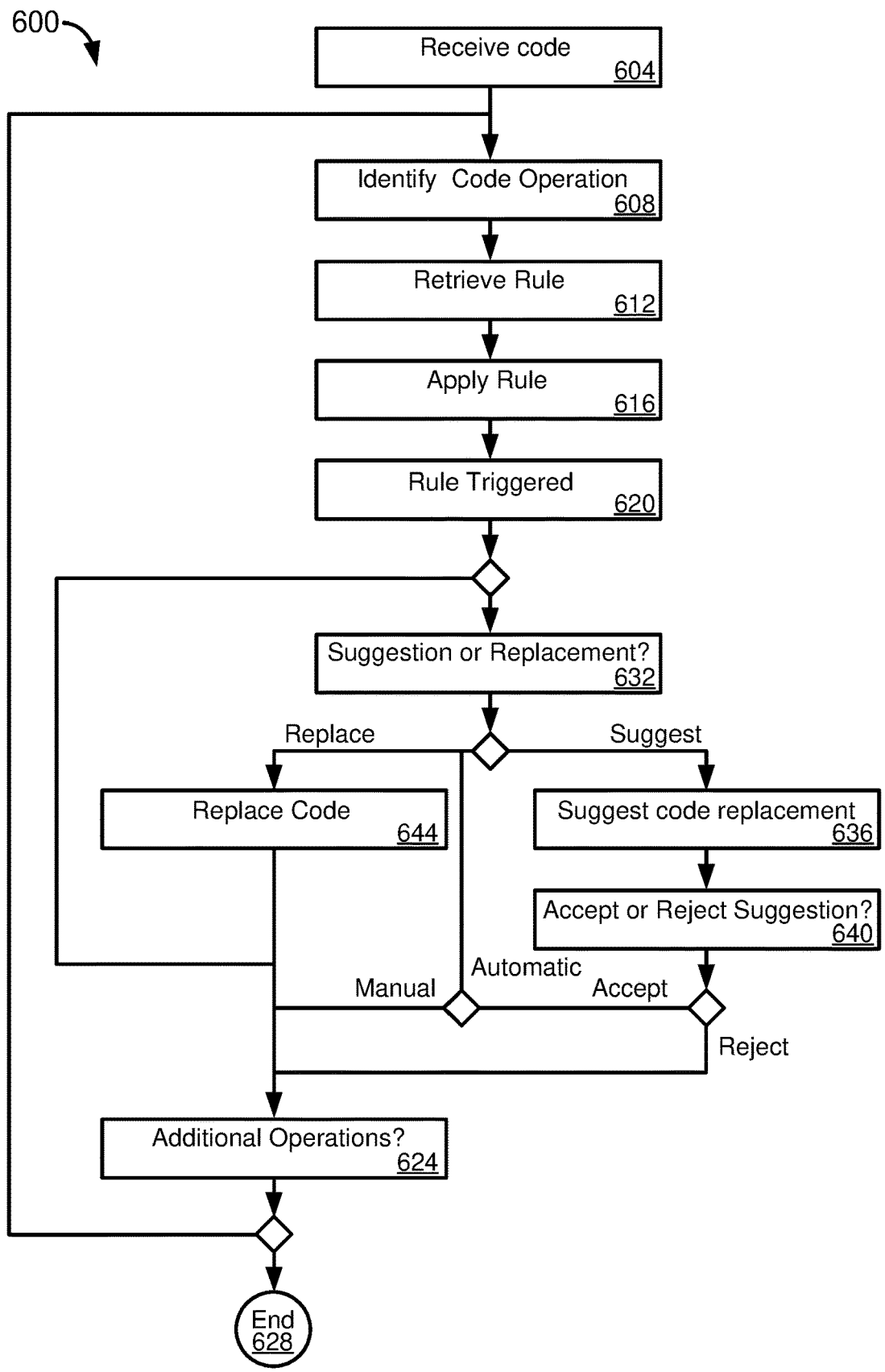
FIG. 6 is a flowchart of a process of analyzing code for operations that may be replaced with more efficient operations.

FIG. 6 presents a flowchart of process 600 for analyzing and modifying code based on energy efficiency considerations. Code to be analyzed is received at 604. A code operation in the code is identified at 608, such as a code operation for which an analysis rule has been defined. The appropriate rule is retrieved at 612 and applied at 616.

It is determined at 620 whether the rule is triggered. For example, it is determined that the analyzed code could be replaced with more energy efficient code. If not, the process 600 can proceed to 624 to determine whether the code includes additional operations to be analyzed. If so, the process 600 can return to 608. If not, the process 600 can end at 628.

If it is determined at 620 that the rule is triggered, at 632 it can be determined whether the analysis, or the particular operation (such as in its corresponding rule), results in automatic modification of code or if a code modification suggestion is provided to a user, who can then confirm that the change should be applied, in which case the user can manually make the change or it can be made automatically, or reject the suggested change. In other implementations, the overall process 600 is either associated with automatic change implementation or providing code suggestions to a user, in which case the operations at 632 can be omitted.

If it is determined at 632 that a suggestion is to be provided, the suggested code replacement is provided to a user at 636, such as by displaying the suggested replacement on a graphical user interface, which can be a display provided by a development environment software application. The user can provide input to accept or reject the suggestion, where the input is analyzed at 640. If it is determined that the suggestion has been rejected by the user, the process 600 proceeds to 624.

If it is determined that the user has accepted the suggestion, the suggestion can be manually implemented by a user, or the process 600 can proceed to 644, to which the process also proceeds if it is determined at 632 that automatic replacement is appropriate. The code replacement is made according to the rule at 644. The process 600 then proceeds to 624. The process 600 can also proceed to 624 if the user selects to accept the code change at 640 and manually makes the change.

Example 6—Example Energy Efficiency Code Analysis Considering Permutations of Multiple Operations In some cases, whether a particular code change results in improved efficiency can depend on the nature of data processed by the code, or combinations of operations specified in the code. Thus, certain disclosed techniques can evaluate the performance of different permutations of code operations, where some suggested changes are made, but other changes may be at least temporarily "reversed" to determine whether an "unexpected" set of permutations might be more performant. This technique can be particularly useful when more than two operations can be used to perform a common function.

FIG. 7 presents a flowchart of a process 700 as described above. Code to be analyzed is received at 704. A code operation is identified at 708, such as a combination for which a rule, having one or more possible code changes to improve energy efficiency, is defined. The rule is applied at 712. It is determined at 716 whether the rule results in a code change. If not, the process 700 proceeds to 720, where it is determined whether the code includes additional operations to be analyzed. If so, the process 700 returns to 708, otherwise the process can end at 724.

If it is determined at 716 that a code change is indicated by application of the rule, the code operation can be replaced with an equivalent operation specified by the rule at 728. The code is also tested at 728, such as executing the code and determining its energy use. It is determined at 732 whether the code change resulted in improved energy efficiency. If the code change provides improved efficiency, the process 700 can proceed to 720. If an improvement was not identified, permutations of code changes indicated by the rule currently being analyzed and the application of previously applied rules can be generated and analyzed at 736. A most performant permutation is selected at 740, where the process 700 then proceeds to 720.

Example 7—Example Rule Definition

As discussed earlier, in some cases rules can manually be defined by a user, including based on their knowledge of a program language and expected computing resource use of implementing a particular function using different code operations. Rules can also be manually entered by a user using disclosed processes. For example, the permutations analyzed in the process 700 can be used to define new rules.

Figure 8:
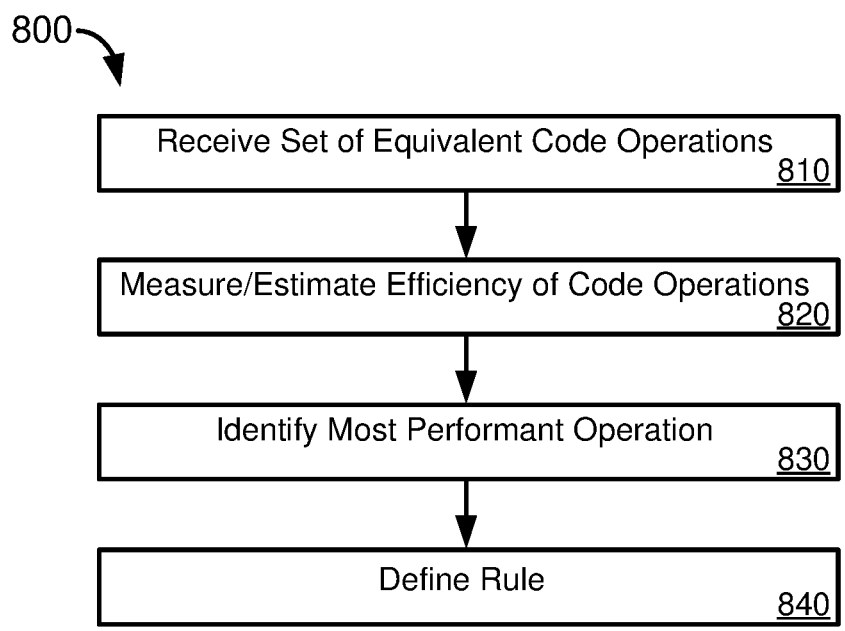
FIG. 8 is a flowchart of a process for defining a rule for improving code energy efficiency.

In other scenarios, a user may be aware of different operations for performing a function, but may be unaware of their relevant performance characteristics. FIG. 8 is a flowchart of a process 800 for automatically defining a rule (or providing information that can be presented to a user who can then optionally choose to define a rule. A set of equivalent code operations is defined/received at 810. The individual operations are executed, and their energy use characteristics are measured/estimated at 820. A most performant code operation is identified at 830. In cases where more than two operations are specified for performing a function, the operations at 830 can including ranking the operations. A rule is defined at 840, such as defining a rule that a less performant operation of the set of possible operations is to be replaced, or suggested for replacement, with a more performant operation.

Example 8—Example Operations for Analyzing Code for Energy Efficiency

Figure 9:
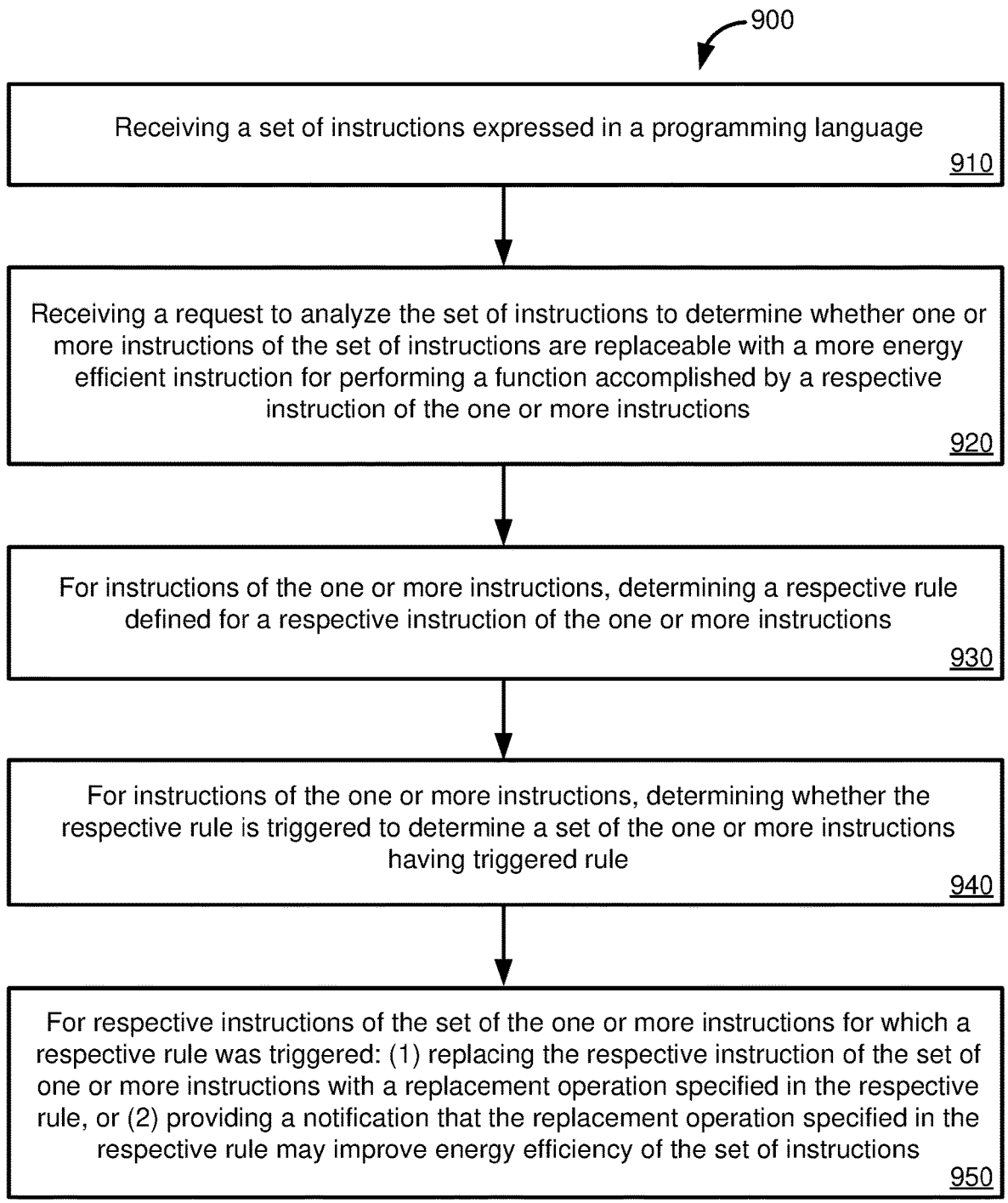
FIG. 9 is a flowchart of a process for evaluating code for potential energy efficiency improvements, and automatically making, or recommending, changes to improve energy efficiency.

FIG. 9 is a flowchart of a process 900 for evaluating code for potential energy efficiency improvements, and automatically making, or recommending, changes to improve energy efficiency.

At 910, a set of instructions expressed in a programming language is received. A request is received at 920 to analyze the set of instructions to determine whether one or more instructions of the set of instructions are replaceable with a more energy efficient instruction for performing a function accomplished by a respective instruction of the one or more instructions. At 930, for instructions of the one or more instructions, a respective rule defined for a respective instruction of the one or more instructions is determined. For instructions of the one or more instructions, it is determined at 940 whether the respective rule is triggered to determine a set of the one or more instructions having triggered rule.

For respective instructions of the set of the one or more instructions for which a respective rule was triggered, at 950, the respective instruction of the set of one or more instructions is replaced with a replacement operation specified in the respective rule. Or, at 950, a notification is provided that the replacement operation specified in the respective rule may improve energy efficiency of the set of instructions.

Example 9—Computing Systems

Figure 10:
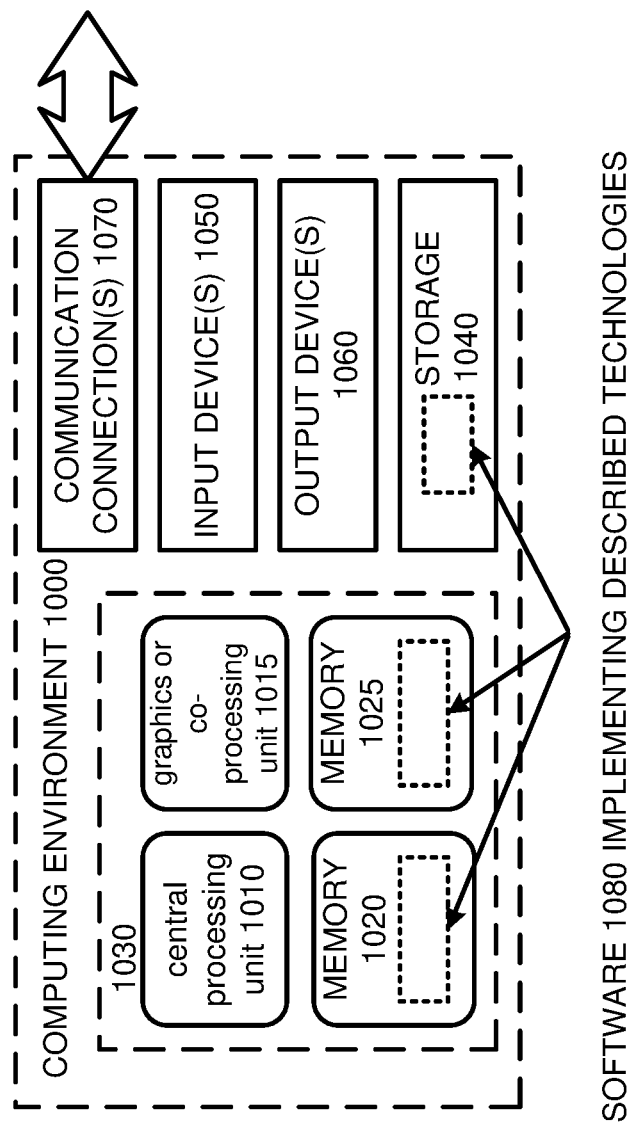
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015. The memory 1020, 1025, may also store settings or settings characteristics, databases, data sets, interfaces, displays, object instances, or model.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 11:
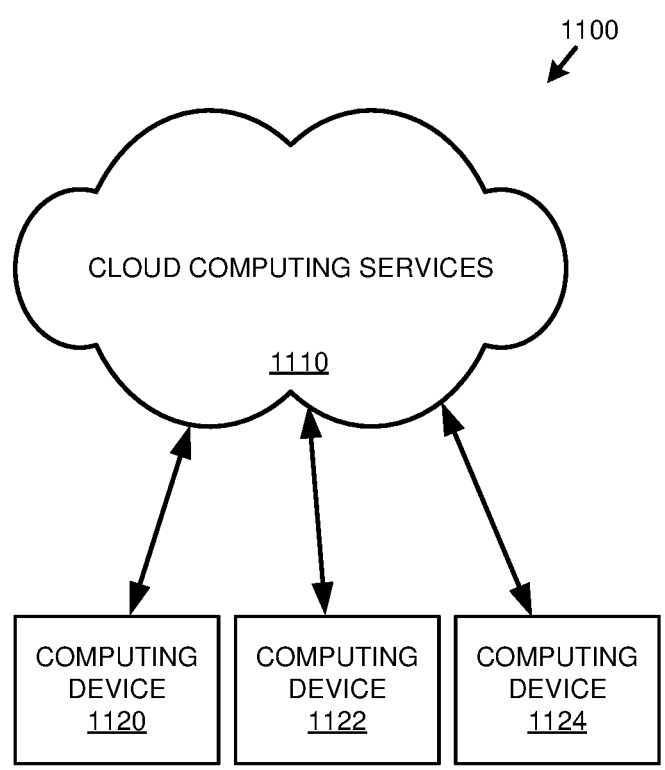
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
   receiving a set of instructions expressed in a programming language;
   performing code evaluation and replacement operations comprising:
   receiving a request to analyze the set of instructions to determine whether one or more instructions of the set of instructions are replaceable with a more energy efficient instruction for performing a function accomplished by a respective instruction of the one or more instructions;
   for each respective instruction of the one or more instructions, determining a corresponding rule defined for the respective instruction;
   for each respective instruction of the one or more instructions, measuring or estimating an amount of energy saved by comparing an amount of energy used or estimated to be used in executing the one or more instructions including the respective instruction with an amount of energy used or estimated to be used in executing the one or more instructions modified to use a replacement operation specified in the corresponding rule in place of the respective instruction;
   for each respective instruction of the one or more instructions, determining whether the corresponding rule is triggered, wherein the corresponding rule is triggered based on the measured or estimated amount of energy saved by replacing the respective instruction with the replacement operation specified in the corresponding rule;
   for respective instructions of the one or more instructions for which the corresponding rule was triggered: (1) in the set of instructions, replacing the respective instruction with the replacement operation specified in the corresponding rule; and
   subsequent to the performing code evaluation and replacement operations, compiling or interpreting the set of instructions with the replacement operation.

2. The computing system of claim 1, the operations further comprising:
   receiving a request to measure or estimate energy use of the set of instructions or the set of instructions with the replacement operation;
   executing the set of instructions or the set of instructions with the replacement operation one or more times and monitoring energy consumed during the executing to provide at least one measured energy use value or measuring an amount of one or more computer resources used by the executing and converting the amount to an estimated amount of energy consumed during the executing; and
   in response to the request, returning an energy use value comprising, or based at least in part on, the at least one measured energy use value or the estimated amount of energy.

3. The computing system of claim 2, wherein the at least one measured energy use value comprises, or is determined at least in part using, an amount of power used by a computer processor and an amount of power used by memory.

4. The computing system of claim 2, wherein the estimated amount of energy comprises, or is determined at least in part using, an estimated amount of power used by a computer processor and an estimated amount of power used by memory.

5. The computing system of claim 2, wherein the executing the set of instructions one or more times is performed in a containerized environment.

6. The computing system of claim 5, wherein the executing the set of instructions one or more times is parallelized between multiple containers of the containerized environment.

7. The computing system of claim 2, where the request to analyze the set of instructions or the set of instructions with the replacement operation is associated with one or more sets of input data to be used with the set of instructions or the set of instructions with the replacement operation during execution of the set of instructions or the set of instructions with the replacement operation.

8. The computing system of claim 7, wherein the one or more sets of input data are comprised within the request to analyze the set of instructions or the set of instructions with the replacement operation.

9. The computing system of claim 2, wherein the at least one measured energy use value comprises an amount of energy saved by, for the respective instructions of the one or more instructions, replacing the respective instructions of the one or more instructions with respective replacement operations specified in the corresponding rules.

10. The computing system of claim 2, wherein the request to measure or estimate energy use of the set of instructions comprises, or is otherwise associated with, a duration for which the set of instructions or the set of instructions with the replacement operation will be executed or a number of times the set of instructions or the set of instructions with the replacement operation will be executed.

11. The computing system of claim 1, wherein the measuring or estimating the amount of energy saved comprises:
   measuring or estimating energy consumed during one or more executions of code comprising the set of instructions to provide a first value;
   measuring or estimating energy consumed during one or more executions of code comprising the set of instructions modified with respective replacement operations to provide a second value; and
   determining a difference between the first value and the second value.

12. The computing system of claim 11, the operations further comprising:
displaying the difference on a user interface screen.

13. The computing system of claim 11, the operations further comprising:
determining a carbon sequestration value associated with the difference.

14. The computing system of claim 11, the operations further comprising:
determining a consumption equivalent for the difference.

15. The computing system of claim 1, wherein a notification that the replacement operation specified in the corresponding rule may improve energy efficiency of the set of instructions is provided.

16. The computing system of claim 1, the operations further comprising:
receiving user input defining at least one corresponding rule, the at least one corresponding rule comprising an instruction in the programming language that triggers the at least one corresponding rule, and one or more instructions in the programming language to be used in place of the instruction in the programming language that triggers the at least one corresponding rule.

17. The computing system of claim 1, wherein the set of instructions is a first set of instructions, the operations further comprising:
receiving a second set of instructions in the programming language, where respective instructions of the second set of instructions accomplish a common task in the programming language;
measuring or estimating energy consumed by respective instructions of the second set of instructions; and
defining at least one rule where at least one less energy efficient instruction of the second set of instructions is replaceable by a more energy efficient instruction of the second set of instructions.

18. A method, implemented in a computing environment comprising at least one hardware processor and at least one memory coupled to the at least one hardware processor, the method comprising:
receiving user input defining at least one rule, the at least one rule comprising an instruction in a programming language that triggers the at least one rule, and one or more instructions in the programming language to be used in place of the instruction in the programming language that triggers the at least one rule;
receiving a set of instructions expressed in the programming language;
performing code evaluation and replacement operations comprising:
receiving a request to analyze the set of instructions to determine whether one or more instructions of the set of instructions are replaceable with a more energy efficient instruction for performing a function accomplished by a respective instruction of the one or more instructions;
for each respective instruction of the one or more instructions, determining a corresponding rule of a set of rules comprising the at least one rule, the corresponding rule defined for the respective instruction;
comparing an amount of energy used or estimated to be used in executing the one or more instructions including the respective instruction with an amount of energy used or estimated to be used in executing the one or more instructions modified to use an alternative instruction specified in the corresponding rule in place of the respective instruction;
for each respective instruction of the one or more instructions, determining whether the corresponding rule is triggered, wherein the corresponding rule is triggered based on a measured or estimated amount of energy saved by replacing the respective instruction with a replacement operation specified in the corresponding rule; and
for respective instructions of the one or more instructions for which the corresponding rule was triggered:
(1) in the set of instructions, replacing the respective instruction with the replacement operation specified in the corresponding rule; and
subsequent to the performing code evaluation and replacement operations, compiling or interpreting the set of instructions with the replacement operation.

19. The method of claim 18, further comprising:
measuring or estimating an amount of energy saved by, for the respective instructions of the one or more instructions, replacing the respective instructions of the one or more instructions with the replacement operation specified in the corresponding rule.

20. One or more computer-readable storage media comprising:
computer-executable instructions that, when executed by a computing system comprising at least one hardware processor and at least one memory coupled to the at least one hardware processor, cause the computing system to receive a set of instructions expressed in a programming language;
computer-executable instructions that, when executed by the computing system, cause the computing system to perform code evaluation and replacement operations comprising:
computer-executable instructions that, when executed by the computing system, cause the computing system to receive a request to analyze the set of instructions to determine whether one or more instructions of the set of instructions are replaceable with a more energy efficient instruction for performing a function accomplished by a respective instruction of the one or more instructions;
computer-executable instructions that, when executed by the computing system, cause the computing system to, for each respective instruction of the one or more instructions, determine a corresponding rule defined for the respective instruction;
computer-executable instructions that, when executed by the computing system, cause the computing system to, for each respective instruction of the one or more instructions, measure or estimate an amount of energy saved by comparing an amount of energy used or estimated to be used in executing the one or more instructions including the respective instruction with an amount of energy used or estimated to be used in executing the one or more instructions modified to use a replacement operation specified in the corresponding rule in place of the respective instruction;
computer-executable instructions that, when executed by the computing system, cause the computing system to, for each respective instruction of the one or more instructions, determine whether the corresponding rule is triggered, wherein the corresponding rule is triggered based on the measured or estimated amount of energy saved by replacing the respective instruction with the replacement operation specified in the corresponding rule: and computer-executable instructions that, when executed by the computing system, cause the computing system to, for respective instructions of the one or more instructions for which the corresponding rule was triggered: (1) in the set of instructions, replace the respective instruction with the replacement operation specified in the corresponding rule; and computer-executable instructions that, when executed by the computing system, cause the computing system to, subsequent to the performing code evaluation and replacement operations, compiling or interpreting the set of instructions with the replacement operation.

* * * * *